May 21, 1963  J. J. LANG ETAL  3,090,259
METHOD OF MAKING SELF-SHARPENING LEDGER PLATES
Filed Aug. 23, 1960  3 Sheets-Sheet 1

INVENTORS.
JOHN J. LANG
STANLEY N. OMAN
BY JAMES F. CRONIN

Wolfe, Hubbard, Voit + Osann
ATTORNEYS.

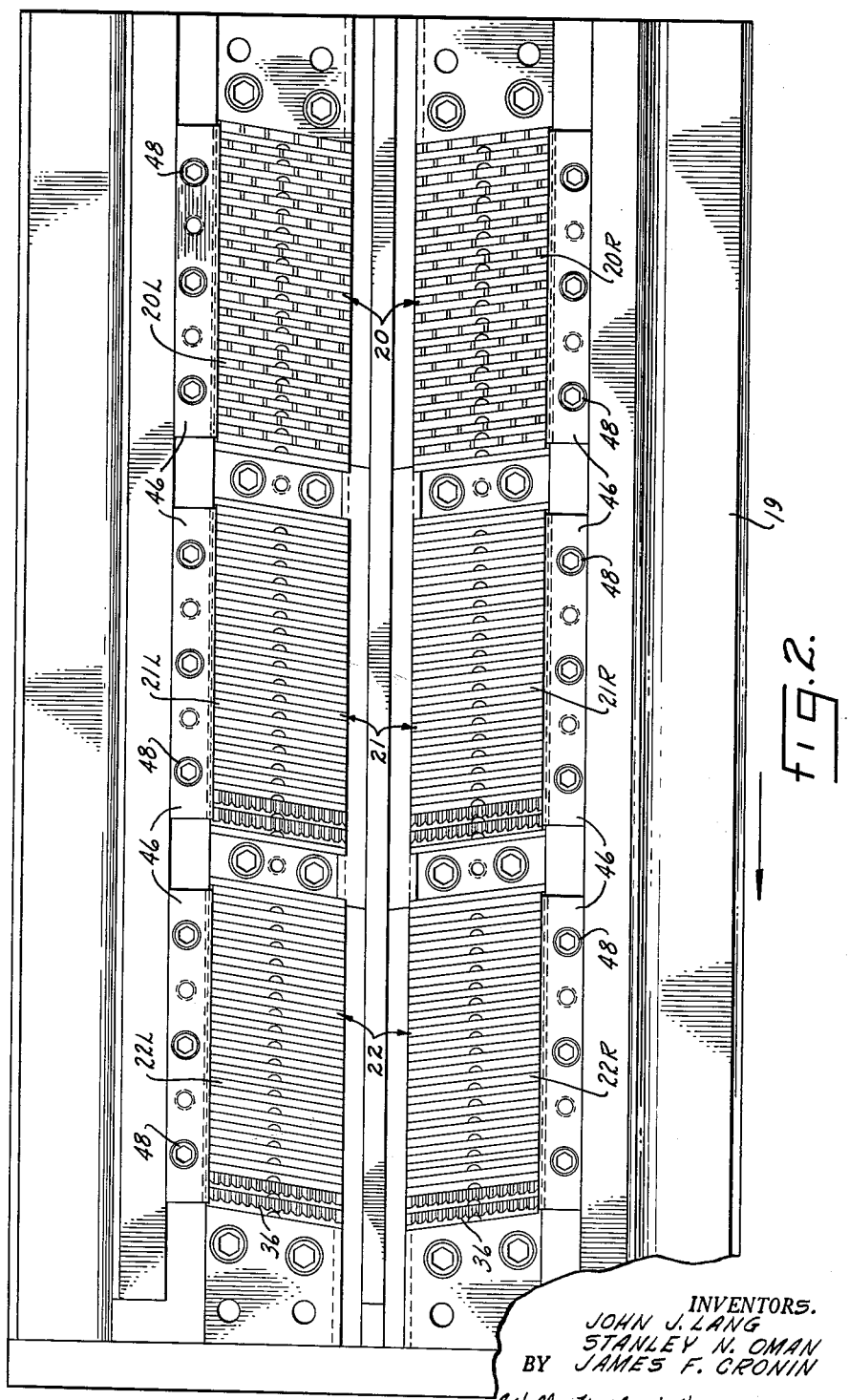

May 21, 1963  J. J. LANG ETAL  3,090,259
METHOD OF MAKING SELF-SHARPENING LEDGER PLATES
Filed Aug. 23, 1960  3 Sheets-Sheet 3
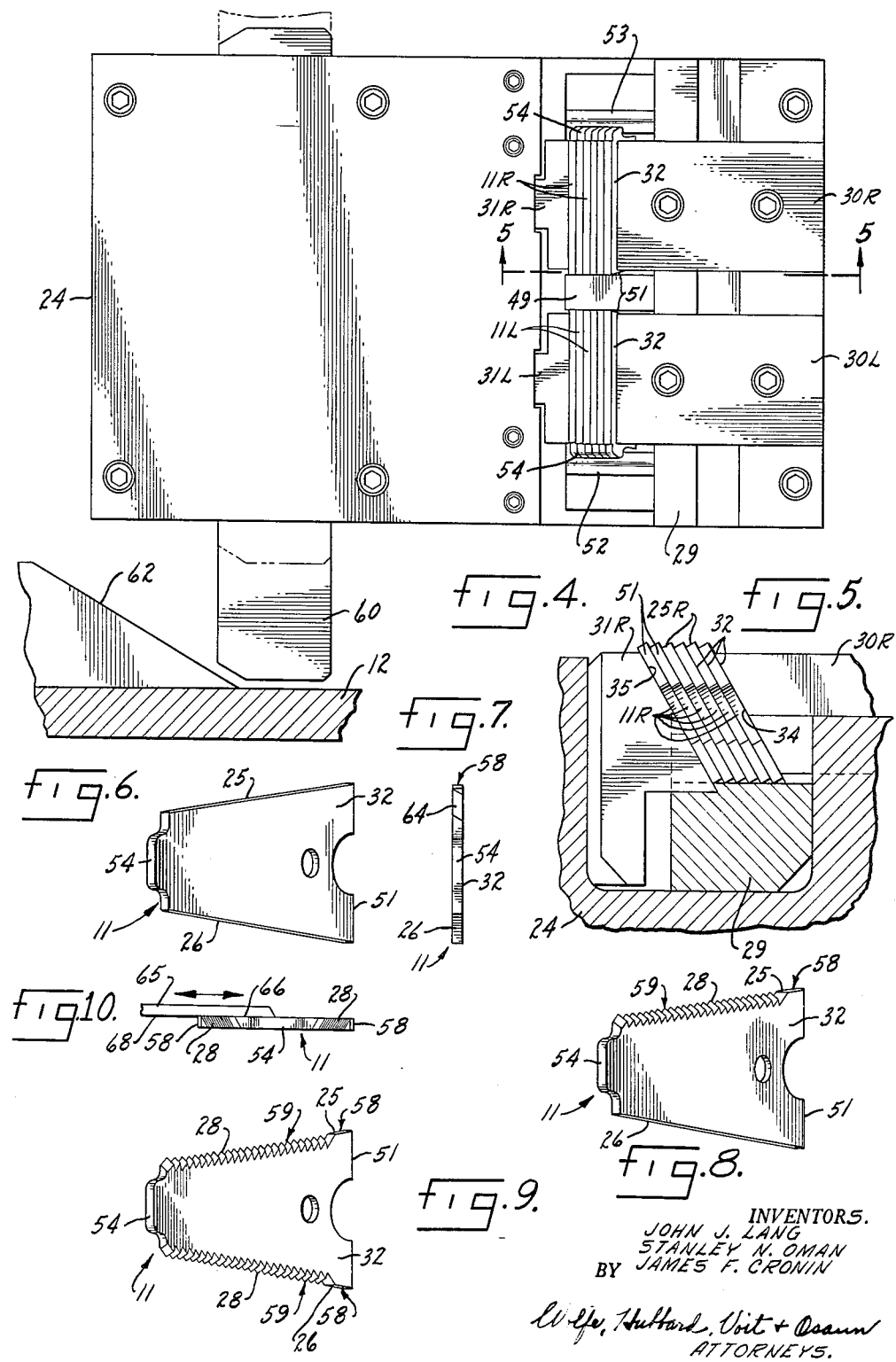
INVENTORS.
JOHN J. LANG
STANLEY N. OMAN
BY JAMES F. CRONIN
ATTORNEYS.

United States Patent Office 3,090,259
Patented May 21, 1963

3,090,259
METHOD OF MAKING SELF-SHARPENING LEDGER PLATES
John J. Lang, Chicago, Stanley N. Oman, Bensenville, and James F. Cronin, Chicago, Ill., assignors to Appleton Electric Company, Chicago, Ill., a corporation of Illinois
Filed Aug. 23, 1960, Ser. No. 51,421
5 Claims. (Cl. 76—89.1)

This invention relates generally to ledger plates for use with sickle bar mowers and, more particularly, to a method of making self-sharpening ledger plates.

It is a general object of this invention to provide a novel method of manufacturing self-sharpening ledger plates on a low cost mass production basis.

A more specific object of this invention is to provide a novel method for forming teeth in the opposed lateral edges of a self-sharpening ledger plate wherein the teeth formed in one lateral edge are protected and damage thereto prevented during the forming operation performed on the opposite lateral edge.

These and other objects and advantages of the invention are attained by the construction and arrangement shown as an exemplary embodiment in the accompanying drawings, in which:

FIG. 2 is a bottom view, taken substantially along the line 2—2 of FIG. 1, disclosing the broaching head that is utilized in forming the ledger plates of the present invention;

FIG. 4 is a plan view, in elevation, showing a supporting chuck with a plurality of ledger plates positioned therein in opposed pairs and fragmentarily disclosing a camming arrangement utilized for actuating the movable chuck jaw;

FIG. 5 is a fragmentary sectional view, taken substantially along the line 5—5 of FIG. 4, showing particularly the inclination of the ledger plates as they are presented to the broaching head;

FIG. 6 is a perspective view of a ledger plate blank;

FIG. 7 is an end view of a partially formed ledger plate showing particularly the beveled edge formed thereon after passing under the first section of the broaching head;

FIG. 8 is a perspective view of a partially formed ledger plate showing particularly the beveled teeth formed in one lateral edge thereof;

FIG. 9 is a perspective view of a completely formed ledger plate and,

FIG. 10 is a fragmentary end view showing particularly the relative positions of ledger plate and cutting blade after assembly to a sickle bar.

Figure 3:
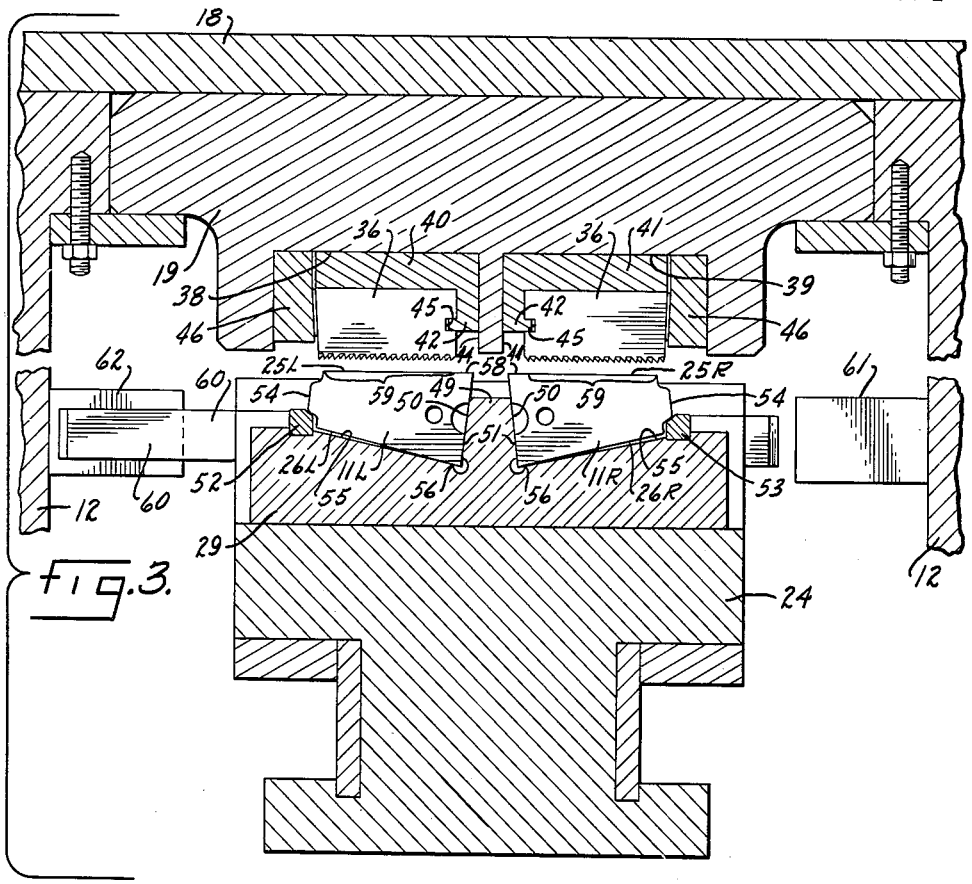
FIG. 3 is a fragmentary sectional view taken substantially along the line 3—3 of FIG. 1 and showing particularly the arrangement of the ledger plates, supporting chuck, and a broaching head with the broaching head raised slightly in order to show the cutting teeth.

While the invention is susceptible of various modifications and alternatives, an illustrative form thereof has been shown in the drawings and will be described in detail below. It should be understood, however, that there is no intention to limit the invention to the specific form disclosed. On the contrary, it is intended here to cover all modifications, alternatives and equivalents falling within the true scope and spirit of the appended claims.

Ledger plates of the present invention are of the type which comprise a flat piece of sheet metal, generally trapezoidal in outline, with a row of teeth on each of its inclined edges. Such plates are used as stationary teeth on the bar of a sickle bar mower and serve to segregate and hold the grass or other vegetation in separated bunches for cutting by reciprocating teeth which pass over the ledger plates.

Figure 1:
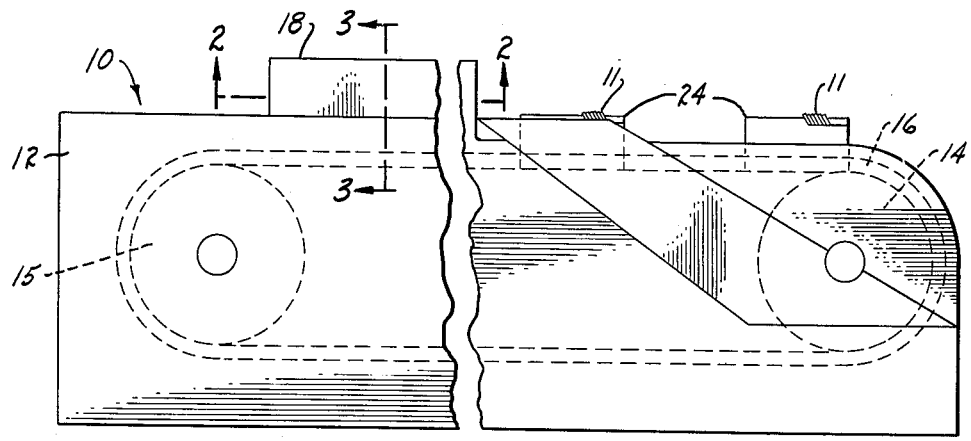
FIGURE 1 is a fragmentary side elevation of a broaching machine used in the novel method of forming the ledger plates of the present invention.

The method of the present invention for making self-sharpening ledger plates will be described in connection with a broaching machine 10, illustrated in FIG. 1, which machine is particularly suited for this purpose. In general arrangement, the broaching machine 10 includes a pair of spaced side walls 12 on which are journalled a pair of sprockets 14, 15 for driving an endless chain, shown in phantom at 16, through conventional power means (not shown). An arbor 18 is mounted on the spaced side walls 12 and extends transversely over the chain 16. The side walls 12 and arbor 18 serve to support a broaching head 19 as shown in FIG. 3. The broaching head 19 is provided with three separate cutting tools or stages 20, 21 and 22 which are positioned to be successively traversed by the ledger plate blanks 11 during the cutting operation (see FIG. 2). Each stage 20, 21 and 22 is subdivided into a pair of longitudinal sections 20L–20R, 21L–21R, 22L–22R respectively, to form opposed pairs of cutting tools in each stage. A plurality of ledger plate supporting chucks 24 are rigidly mounted on the driving chain 16 for moving the ledger plate blanks 11, which are arranged in opposed pairs 11L, 11R, past the broaching head 19 in successive cutting relationship with the stages 20L–22L and 20R–22R respectively.

In carrying out the method of the present invention, blanks 11 of sheet metal, see FIG. 6, are punched or otherwise formed from suitable stock with a trapezoidal or triangular outline having a pair of inclined cutting edges 25, 26. A number of the blanks are then stacked face-to-face and firmly held in stacked relation. In accordance with the present method, the stack is tilted such that each blank is off-set slightly with respect to the next blank in the stack. In this manner, the corresponding cutting edge, for example, the edge 25, of each blank projects from the stack and is exposed.

By so stacking and holding the blanks, teeth 28 which are beveled with respect to the faces of the ledger plate, may be formed. For accomplishing this, the stack of blanks is then moved along a straight line path with the faces of the blanks inclined forwardly in the direction of travel and with the top edges 25 leading the lower edges 26 of the blanks 11.

In connection with the illustrative machine 10 of the drawings, each chuck 24 is provided with a supporting base 29, a pair of fixed jaws 30L, 30R and a pair of movable jaws 31L, 31R. In order that the teeth 28 formed in each of the ledger plate blanks 11 may be beveled with respect to the plane of the plate, the ledger plate blanks 11 are presented to the cutting stages 20–22 with the bottom surface 32 of each plate being inclined in the direction of movement of the plates towards the broaching head. This is accomplished by providing the fixed jaws 30L, 30R and the movable jaws 31L, 31R with complementary, forwardly inclined, clamping surfaces 34 and 35 respectively, between which the ledger plate blanks 11 are stacked and rigidly clamped in a plurality of opposed pairs 11L, 11R (see FIGS. 4, 5). While it will be understood that the degree of inclination of the complementary clamping faces 34 and 35, and hence the degree of inclination of each of the ledger plate blanks 11, may vary dependent upon the degree of bevel desired in the ledger plate teeth 28, it has been found that excellent results are obtained when the ledger plate blanks 11 are inclined forwardly toward the broaching head 19 at an angle of approximately 30° from a vertical position.

During the straight line movement of stacks of blanks 11L, 11R the beveled teeth 28 are formed on the upper exposed lateral edges 25L, 25R by progressive removal of increments of stock. This is accomplished by moving the stack under a stationary cutting tool of proper contour to form beveled teeth. In connection with the machine 10, this cutting tool comprises a plurality of broaching blades 36 arranged in successive stages 20L–22L, 20R–22R. While it is intended that a plurality of blades 36 be mounted in each of the stages 20–22, only two such broaching blades have been illustrated in FIG. 2 in each of the stages 21L, 21R and 22L, 22R for purpose of clarity. The broach blades 36 are rigidly mounted in a pair of longitudinally extending channels 38, 39 formed in the undersurface of the broaching head 19 so that a progressively deeper cut is made by each blade 36 as the blank 11 traverses each stage 20–22. While it will be understood that the manner of mounting blades 36 in the broaching head 19 may take various forms, there is illustrated in FIGS. 2 and 3 a preferred embodiment in which a pair of support members 40, 41 are rigidly mounted in the channels 38, 39 respectively, so as to provide an outwardly extending tongue 42 which extends laterally from the innermost wall 44 of each channel 38, 39. The tongue 42 is positioned to be received within a groove 45 formed on the innermost end of each broach blade 36. The blades 36 are retained in locking engagement with the tongues 42 on the support members 40, 41 by means of wedges 46 positioned in the channels 38, 39 respectively so as to engage the outermost extremity of each broach blade 36. The wedges 46 are rigidly anchored to the broaching head 19 by any suitable means, for example, bolts 48. In order to minimize the strain imparted to each broach blade 36 as metal is removed from the ledger plate blanks 11 in successive cuts, the cutting action takes place progressively from the outer end of each exposed edge, for example, edge 25, to the inner end thereof. This is achieved in the illustrative machine 10 by setting the blades 36 into the broaching head 19 at a slight angle so as to provide a shearing angle between blades 36 and the blanks 11 (see FIG. 2).

While the amount of metal removed in each successive cutting operation is not critical in manufacturing the self-sharpening ledger plates of the present invention, it has been found that excellent results are obtained by utilizing approximately nineteen blades in each stage 20–22 with each blade positioned to make a successively deeper cut of approximately .003 inch, thereby making a total depth of cut of .057 inch by each stage 20–22. Moreover, it has been found that an effective shearing angle is obtained when the broach blades 36 are set into the head 19 at approximately an 8° angle.

It will be understood that after the proper amount of stock is removed to form the required beveled teeth 28, each stack of blanks 11 may be released one from the other and stored until ready for the next step or may be held together in stacked relationship. In the machine 10, the finished ledger plates are automatically discharged on to a conveyor or into a hopper or other suitable container (not shown) with beveled teeth 28 formed in the exposed lateral edge 25 (see FIG. 8).

When the teeth have been formed in one lateral edge, for example, 25L, 25R, of each ledger plate blank 11L, 11R respectively, the blanks are then reversed, reorienting the blanks with the opposite lateral edge 26L, 26R of each blank 11L, 11R respectively being exposed. This is accomplished by effectively rotating the blanks 180° about an axis perpendicular to the plane of the blanks. The blanks are again stacked and firmly held in a tilted position such that the corresponding exposed edge 26L, 26R of each blank projects from the stack and is exposed. The reversed stacks of blanks are then moved in a straight line beneath the cutting stages 20–22 to form teeth 28 in the exposed lateral edges 26 by progressive removal of increments of stock, in the same manner as that performed during the formation of teeth 28 on the edges 25. It will be understood that during the reversing step, the opposed pairs of blanks 11L and 11R are not only inverted, but also interchanged, so that during the formation of teeth 28 on the exposed lateral edges 26, the lateral edges 26L, 26R are presented to the cutting stages 20R–22R and 20L–22L respectively.

For insuring that no damage will be inflicted to the teeth 28 formed in the lateral edge 25 of each of the ledger plate blanks 11 during the broaching operation performed on the opposite lateral edge 26 of the blank, the supporting base 29 is provided with a novel three-point support arrangement (see FIG. 3). The supporting base 29 includes a longitudinally extending, raised central portion 49 having upwardly converging side walls 50 positioned to abut and support the base 51 of each blank 11L, 11R in each of the opposed pairs of blanks. A pair of longitudinally extending raised shoulders 52, 53 are rigidly mounted on the supporting base 29 and positioned to engage and support a reduced tip portion 54 of each ledger plate blank, 11L, 11R respectively, so as to maintain the exposed lateral edge (for example, the exposed lateral edges 25L, 25R shown in FIG. 3) of each blank being presented to the broaching tools in a horizontal plane. It will be appreciated that the supporting base 29 tapers downwardly from each of the longitudinal shoulders 52, 53 towards the base of the raised central portion 49 with the degree of taper such that the upper tapered surface 55 of the base 29 is out of contact with the adjacent lateral edge (26L and 26R in FIG. 3) throughout the major extent of the lateral edge with the only point of contact between the blanks 11 and the upper tapered surface 55 being in proximity to the base 51 of each blank as illustrated at 56. Thus it can be seen that the surfaces 50, 52 and 56 on the supporting base provide an effective three-point support for each of the ledger plate blanks 11L, while the surfaces 50, 53 and 56 provide an effective three-point support for each of the paired ledger plate blanks 11R. The three-point supports provided by the supporting base 29, in conjunction with the inclined clamping surfaces 34, 35 of the fixed jaws 30 and movable jaws 31, serve to rigidly anchor the opposed pairs of ledger plate blanks in a fixed inclined position for presentation to the broaching tools.

Referring to FIG. 3, it will be appreciated that as the exposed lateral edges of the opposed ledger plate blanks 11L, 11R (for example, lateral edges 25L, 25R) are presented to the cutting stages 20L–22L, 20R–22R respectively, a base portion 58 of each lateral edge extends inwardly of the innermost teeth on the respective cutting blades 36. As the blanks 11 successively traverse the cutting stages, teeth 28 are formed in the central portion 59 of the lateral edges 25, with the toothed central portion 59 terminating short of the reduced tip portion 54 and the base portion 58 (see FIGS. 8 and 9). When the opposed pairs of ledger plate blanks 11L, 11R have successively traversed the cutting stages 20L–22L, 20R–22R respectively and teeth 28 have been formed in the central portion 59 of the exposed lateral edges 25L, 25R, the ledger plate blanks are rotated in the manner described above and repositioned in the chuck 24 so as to present the opposed lateral edges 26L, 26R to the cutting stages 20R–22R, 20L–22L respectively. When thus repositioned it is apparent that the three-point support provided by the supporting base 29 engages the ledger plate blanks 11 only at the untoothed reduced tip 54, the untoothed base 51 and the untoothed base portion 58 of the lateral edges 25. Since the toothed portion 59 of each lateral edge 25 is entirely out of contact with the supporting base 29 the subsequent broaching operation performed on each exposed lateral edge 26 does not tend to damage the teeth already formed.

To permit automatic clamping of the opposed pairs of ledger plates prior to a broaching operation and automatic unclamping of the plates after the broaching operation, each of the chucks 24 are provided with a cam actuated locking bar 60 which extends transversely through the chuck 24 and is connected to the movable jaws 31L, 31R through suitable actuating linkage (not shown). A cam 61 is rigidly affixed to the broaching machine 10, for example, to the right hand side wall 12 as viewed in FIG. 3, at a point intermediate the sprocket 14 and the arbor 18. The cam 61 is positioned to engage the right hand end of the locking bar 60 and drive the locking bar to the left into locking position. Movement of the bar 60 to the left results in rearward movement of the movable jaws 31L, 31R, thus causing the inclined surface 35 of the movable jaws to engage the leading ledger plate blanks 11L, 11R and securely clamp the blanks in place. A second cam 62 is rigidly mounted to a stationary part of the broaching machine, for example, the left side wall 12 as viewed in FIG. 3, at a point between the sprocket 15 and the arbor 18. Cam 62 serves to drive the locking bar 60 to the right into unlocking position when the ledger plates 11 have completely traversed each of the stages in the broaching head 19. Movement of the locking bar to the right results in forward movement of the movable jaws 31L, 31R, thereby unclamping the ledger plate blanks 11L, 11R respectively. Thus, when the blanks have traversed the successive cutting stages and are unclamped, they are free to fall under the influence of gravity as the chuck 24 passes around the sprocket 15. The blanks are then returned to the operator by means of a conventional conveyor system or the like (not shown). The cams 61, 62 shown in FIG. 3 are of the same general configuration, each having a laterally inclined cam surface as best illustrated in the plan view of cam 62 shown in FIG. 4. Of course, those skilled in the art will appreciate that the cam 61 (not shown in FIG. 4) will have a similar inclined cam surface suitable for driving the locking bar 60 to the left (as viewed in FIG. 3).

In carrying out the method of producing the self-sharpening ledger plates of the present invention, a plurality of ledger plate blanks 11 (see FIG. 6) are first mounted in a chuck 24 in a plurality of opposed pairs 11L, 11R. The chain 16 is then actuated to advance each of the chucks 24 towards the broaching head 19. As the chucks advance, the locking bar 60, which is in the unlocked position, engages the fixed cam 61 and is driven to the left, thus locking the opposed pairs of ledger plate blanks in place in the chuck. The chuck 24 is advanced and the exposed lateral edges 25L, 25R of the ledger plate blanks engage successively each of the plurality of blades 36 in the first cutting stage 20L, 20R respectively, with each blade taking a successively deeper cut and removing an additional increment of stock. When the ledger plate blanks 11 have completely traversed the first stage 20 of the three cutting stages 20–22, the exposed lateral edge 25 of each blank has formed thereon a flat beveled edge 64 (see FIG. 7).

Further advancement of the chuck 24 causes the flat beveled edge 64 of each ledger plate blank to successively engage each of the broaching blades 36 in the second cutting stage 21. As the ledger plate blanks 11 traverse the blades 36 in the second cutting stage 21, alternate teeth 28 are formed in the beveled edge 64. The blanks 11 are then presented successively to the broaching blades 36 in the third cutting stage 22 wherein intervening teeth 28 are formed in the beveled edge 64, of each blank 11.

Due to the fact that the broaching blades 36 are set into the head 19, at a desired shearing angle (see FIG. 2), it will be understood that, as the opposed pairs of blanks 11L, 11R traverse the cutting stages 20–22, there is a tendency to urge the blanks into more intimate contact with the three-point supporting surfaces provided by the supporting base 29. Thus, the possibility of blanks 11 being forced out of the supporting chuck 24 is effectively eliminated.

Further advance of the chuck causes the left hand end of the locking bar 60 to engage cam 62 so as to drive the locking bar to the right and unclamp the ledger plate blanks which are then discharged from the chuck 24 through a gravity discharge as the chuck moves around the sprocket 15. At this point in the operation teeth 28 have been formed in the central portion 59 of the lateral edge 25 of each blank 11 (see FIG. 8).

After the blanks have been discharged from the chucks they are returned to the operator through any conventional means (not shown) ready for the formation of teeth in the opposite lateral edge 26. The operator then repositions the ledger plate blanks 11 in the chuck with the toothed lateral edges 25 in proximity to the supporting base 29 and the untoothed lateral edges 26 exposed to the broaching head 19. In effect, the repositioning of the partially formed ledger plates constitutes a rotation of the plates through an angle of 180° about an axis perpendicular to the plane of the plate so as to present the exposed lateral edges 26L to the cutting stages 20R–22R while simultaneously presenting the exposed lateral edges 26R to the cutting stages 20L–22L. The broaching cycle of operation is then repeated to form teeth 28 in the central portion 59 of the exposed lateral edge 26 of each blank. The completed self-sharpening ledger plate is thus provided with a plurality of teeth 28 in the central portion 59 of each of the opposed lateral edges 25 and 26, the teeth in each edge being inclined towards the teeth in the opposite edge.

The self-sharpening feature of the ledger plate 11 of the present invention may be more readily understood by reference to FIG. 10 wherein the reciprocating movement of a conventional cutter blade 65 on a sickle bar mower relative to a fixed self-sharpening ledger plate 11 is illustrated by the arrow. It will be apparent to those skilled in the art that as the cutter blade 65 slides back and forth over the ledger plate 11, the upper surface 66 of the ledger plate and the lower surface 68 of the cutter blade are progressively worn. In addition to the wear occurring between the surfaces 66 and 68, there is also a gradual lateral wearing of the teeth 28 due to the abrasive action of dirt and other foreign material. With conventional ledger plates not employing beveled teeth, a point is eventually reached where the teeth are completely worn away and the resultant smooth surface is unable to grip the material being cut for shearing action by the cutter 65. However, it will be appreciated by those skilled in the art that a ledger plate made in accordance with the present invention will be self-sharpening due to the presence of the beveled teeth 28. Thus, as the teeth 28 gradually wear laterally, the upper surface 66 of the ledger plate is also worn down through co-action with the cutter member 65 and abrasive action from foreign materials, with the result that a sharp set of teeth 28 are continuously juxtaposed beneath the cutting member 65.

By following the method of manufacture of the present invention, it will be appreciated that self-sharpening ledger plates may be rapidly and economically produced on a mass production basis with a minimum of effort on the part of an operator. Thus, it is necessary merely for the operator to insert the ledger plate blanks in the chuck in a plurality of opposed pairs and to start the broaching machine so as to pass the ledger plates beneath the broaching head 19, in cutting relationship therewith, thereby forming teeth in one exposed lateral edge of each ledger plate blank. The blanks are then automatically ejected from the chuck and returned to the operator who repositions them in the chucks with the opposite lateral edge of each plate exposed to the broaching tool and again initiates movement of the chucks and plates beneath the broaching head. Morover, it will be apparent to those skilled in the art that a self-sharpening ledger plate made in accordance with the present invention will have a greatly prolonged life, in view of the fact that lateral wear of the beveled teeth is accompanied by wearing of the upper surface of the ledger plate with the result that sharp teeth are continuously juxtaposed beneath the cutting member 65.

We claim as our invention:

1. The method of forming self-sharpening teeth in the opposed lateral edges of a plurality of ledger plates with a broaching tool having first and second longitudinal sections disposed in side-by-side relationship, the method comprising the steps of, supporting said plurality of ledger plates in opposed pairs with one lateral edge of each ledger plate exposed to the broaching tool and with one face of each ledger plate inclined in the direction of movement of said plates towards the broaching tool, passing the ledger plates in proximity to the broaching tool so that one plate in each of said opposed pairs is in cutting relationship with said first longitudinal section while the other plate of each of said opposed pairs is in cutting relationship with said second longitudinal tool section so that teeth are formed in the central portion of said one exposed lateral edge of each of said inclined ledger plates, reversing said ledger plates and supporting each of said plates on the untoothed extremities of said one lateral edge with the opposite central portion of the lateral edges of said reversed plates exposed to the broaching tool and with the same face of each of said ledger plates inclined in the direction of movement of said plates towards the broaching tool, and passing the ledger plates in proximity to the broaching tool so that said one plate in each of said opposed pairs is in cutting relationship with said second longitudinal section while the other plate of each of said opposed pairs is in cutting relationship with said first longitudinal section.

2. The method of forming self-sharpening teeth in the opposed lateral edges of a ledger plate with a broaching tool having first and second longitudinal sections disposed in side-by-side relationship each of said sections being subdivided into three successive cutting stages, and a plurality of broaching blades being successively disposed in each of said stages, the method comprising the steps of, supporting said ledger plate on at least three sides thereof with one face of the plate inclined in the direction of movement of a said plate towards the broaching tool and with one lateral edge of the plate exposed to the broaching tool, passing the ledger plate in proximity to said first longitudinal section in cutting relationship therewith, forming a flat tapered surface on the exposed lateral edge of said plate with the broaching blades in the first of said three successive cutting stages, forming alternate teeth in the exposed lateral edge of said plate with the broaching blades in the second of said three successive stages, forming intervening teeth in the exposed lateral edge of said ledger plate with the broaching blades in the third of said three successive cutting stages, reversing said ledger plate and supporting said plate on at least three sides with the same face of said plate inclined towards the broaching tool, and passing said ledger plate in proximity to the second longitudinal section in cutting relationship therewith so as to form teeth in said lateral opposite edge.

3. The method of forming self-sharpening teeth in the opposed lateral edges of a plurality of ledger plates which comprises, supporting said plurality of ledger plates in opposed pairs on at least three sides with the bottom face of each plate in each of said opposed pairs being inclined in the direction of movement of the said plates towards a cutting tool, passing said opposed pairs of inclined ledger plates in proximity to a first cutting tool in cutting relationship therewith so that a tapered flat surface is formed on the exposed edge of each of said inclined ledger plates, passing said inclined ledger plates beneath a second cutting tool in cutting relationship therewith so that alternate teeth are formed in the exposed lateral edges of each of said inclined ledger plates, passing said inclined ledger plates in proximity to a third cutting tool in cutting relationship therewith so that intervening teeth are formed in the exposed lateral edges of each of said inclined ledger plates, reversing said plates so that the opposite lateral edge of each plate is exposed and supporting said reversed plates on at least three sides so that the bottom face of each plate is inclined towards the cutting tools, and passing said reversed inclined plates in proximity to said first, second, and third cutting tools in cutting relationship therewith so that teeth are formed in the opposite lateral edges of said ledger plates.

4. The method of forming self-sharpening teeth in the opposed lateral edges of a plurality of ledger plates which comprises supporting said plurality of ledger plates in opposed pairs with the bottom face of each plate in each of said opposed pairs being inclined in the direction of movement of said plates towards a cutting tool, each plate being supported on at least three sides so that one lateral edge of each plate is exposed to the cutting tool, passing said opposed pairs of inclined ledger plates in proximity to a first cutting tool having a plurality of successively disposed blades so that a tapered flat surface is formed on the exposed lateral edge of each of said plates, each of said blades positioned to take a progressively deeper cut as the plate traverses said first cutting tool, passing said inclined ledger plates beneath a second cutting tool having a plurality of successively disposed blades positioned to take progressively deeper cuts so that alternate teeth are formed in the exposed lateral edges of said plates, passing said plurality of ledger plates in proximity to a third cutting tool having a plurality of successively disposed blades positioned to take progressively deeper cuts so that intervening teeth are formed in the exposed lateral edge of each plate, reversing said plates so that the opposite lateral edge of each plate is exposed and supporting said reversed plates on at least three sides so that the bottom face of each plate is inclined towards the cutting tools, and passing said reversed inclined ledger plates in proximity to said first, second and third cutting tools in cutting relationship therewith so that teeth are formed in the opposite lateral edges of said plates.

5. The method of forming self-sharpening ledger teeth in the opposed lateral edges of a plurality of ledger plates which comprises supporting said plurality of ledger plates so that a first lateral edge of each plate is exposed and so that the bottom face of each plate is inclined towards a cutting tool, forming teeth in the central portion of said first exposed lateral edges by passing the ledger plates in proximity to the cutting tool in cutting relationship therewith, reversing said plurality of ledger plates so that the opposite lateral edge of each plate is exposed and supporting the reversed plates on the untoothed extremities of said first lateral edges with the bottom faces of said plates inclined towards the tool, and forming teeth in the central portion of the opposite exposed lateral edges of said plates by passing the inclined plates in proximity to the cutting tool in cutting relationship therewith.

References Cited in the file of this patent

UNITED STATES PATENTS

| | | |
|---|---|---|
| 105,044 | Clark | July 5, 1870 |
| 524,965 | Gindorff | Aug. 21, 1894 |
| 1,035,736 | Puppe | Aug. 13, 1912 |
| 1,435,514 | Burns | Nov. 14, 1922 |
| 2,525,949 | Sabre | Oct. 17, 1950 |

FOREIGN PATENTS

| | | |
|---|---|---|
| 115,059 | Great Britain | Apr. 22, 1918 |